United States Patent [19]
Daoud

[11] Patent Number: 6,148,133
[45] Date of Patent: Nov. 14, 2000

[54] CABLE BEND LIMITER TROUGH

[75] Inventor: Bassel Hage Daoud, Parsippany, N.J.

[73] Assignee: Lucent Technologies, Inc., Murray Hill, N.J.

[21] Appl. No.: 09/146,464

[22] Filed: Sep. 3, 1998

[51] Int. Cl.$^7$ .................................................. G02B 6/00
[52] U.S. Cl. ........................... 385/135; 385/134; 385/137
[58] Field of Search ................................... 385/135, 147, 385/134, 136, 137, 138, 139; 174/135, 95

[56] References Cited

U.S. PATENT DOCUMENTS 5,824,957  10/1998  Holshausen ............................... 174/95

*Primary Examiner*—Phan T. H. Palmer
*Attorney, Agent, or Firm*—Howard C. Miskin; Gloria Tsui-Yip

[57] ABSTRACT

A trough for safely retaining and routing fiber optic cables having a predetermined minimum bend radius entering or exiting an opening of a building entrance protector. The trough comprises of a cylindrical elongated O-shaped body defining a hollow space therebetween for retaining the cables, and a semi-circular curved gap on the body which provides cables access to the space. A pair of ribs extend from the body for slidable engagement with slots of the openings of a building entrance protector. The cross-section of the cylindrical body and the semi-circular curved gap have a predetermined radius equals to or greater than the minimum bend radius prescribed for the fiber optic cables. The trough has two separate retention mechanisms for securing it with the openings of a building entrance protector. The first retention mechanism is of a protrusion-recess type, located at the ribs and slots of the opening respectively. The second retention mechanism is of a latch-groove type, located at the bottom section of the body and along the opening of the building entrance protector respectively.

17 Claims, 4 Drawing Sheets

CABLE BEND LIMITER TROUGH

FIELD OF THE INVENTION

The invention relates to a device that safely secures and routes cables entering or exiting a building entrance protector without jeopardizing the integrity of the cables and is positively attached to the building entrance protector. It is particularly useful with fiber optic cables.

BACKGROUND OF THE INVENTION

Building entrance protector, i.e. junction box, provides an interface for cables from the central office of the service provider for distribution throughout the building served by the junction box. Numerous cables and wires enter and exit a junction box. To accommodate an uncertain number of cables and wires entering or exiting a junction box at a particular location, a junction box is typically molded with multiple openings or notches on all four sidewalls of the box. Each notch is slotted to allow either a flat trough or a flat solid plate to be slid into the notch, depending on the specific requirement at the location of the junction box. Troughs having one or two compartments may be used, for separating and retaining one or two types of cables or wires, respectively, within an opening. Each compartment of a trough is a frame-like body having a gap on the top portion for sliding cables or wires into and out of the compartment for quick access, which also promotes accidental slippage of cables or wires from the compartment. Where openings on the box are more than necessary, solid plates are utilized to prevent undesirable elements, such as insects and dust, from entering the box. Both the troughs and solid plates are slid in between slots of the openings and held in place by frictional forces, without any positive retention.

Wires and cables entering or exiting a junction box change direction by as much as ninety to one hundred and eighty degrees. Fiber optic cables passing through a prior art trough at an angle rest against the sharp and narrow edge of the trough. Hence, the prior art flat trough is not suitable for fiber optic cables, which must maintain a minimum bend radius to prevent damage to and breakage of the cables. Furthermore, the prior art troughs and solid plates may be easily displaced from the openings on the sidewalls of the junction box.

Therefore, there is a need for an invention that safely secures and routes fiber optic cables entering or exiting a junction box without causing damage to the cables, provides quick access to such cables and positively secures such an invention with the junction box.

SUMMARY OF THE INVENTION

The invention provides a device for safely securing and routing fiber optic cables entering or exiting a building entrance protector without jeopardizing the integrity of the cables and for positively engaging it with the building entrance protector.

The invention provides a trough having a compartment with the curvature of the inner section of the compartment having a predetermined minimum bend radius for fiber optic cables, a curved opening having the minimum bend radius at the top portion of the trough for quick access of cables to and from the compartment and two retention mechanisms for positively securing the trough to the opening of a building entrance protector.

The trough of the present invention comprises a cylindrical elongated O-shaped body generally similar to the shape of a donut. The inner section of the elongated O-shaped body defines a compartment for securing cables and/or wires. The round cross-section of the cylindrical body has a predetermined radius, resulting in a predetermined curvature for the inner section of the elongated O-shaped body.

A pair of ribs protrude from the left and right sides of the elongated O-shaped body for slidable engagement with respective slots for an opening in a junction box. A pair of semi-spherical protrusions at each end of the ribs mate with a corresponding pair of semi-spherical recesses in each slot of the opening in the junction box for positive retention of the trough.

At the top portion of the elongated O-shaped body is a semi-circular curved gap at a predetermined radius, which provides fiber optic cables access to the compartment. The curved gap prevents accidental slippage of cables from the compartment, which may result in the closing of the junction box cover over the cables and thereby severing the cables. At the bottom portion of the elongated O-shaped body, about one quarter of the cylindrical shape is removed to accommodate a second retention mechanism comprising a latch which engages a groove along the opening of the junction box.

Both the curvature of the inner section of the elongated O-shaped body and the curved gap are at a predetermined radius that is equal to or greater than the predetermined minimum bend radius of the fiber optic cables. Hence, during and after insertion of the cable into the compartment of the trough, the cables would not bend at an angle below the minimum bend radius. Thereby maintaining the integrity of the fiber optic cables.

DETAILED DESCRIPTION OF THE PREFERRED EMBODIMENTS

Figure 1:
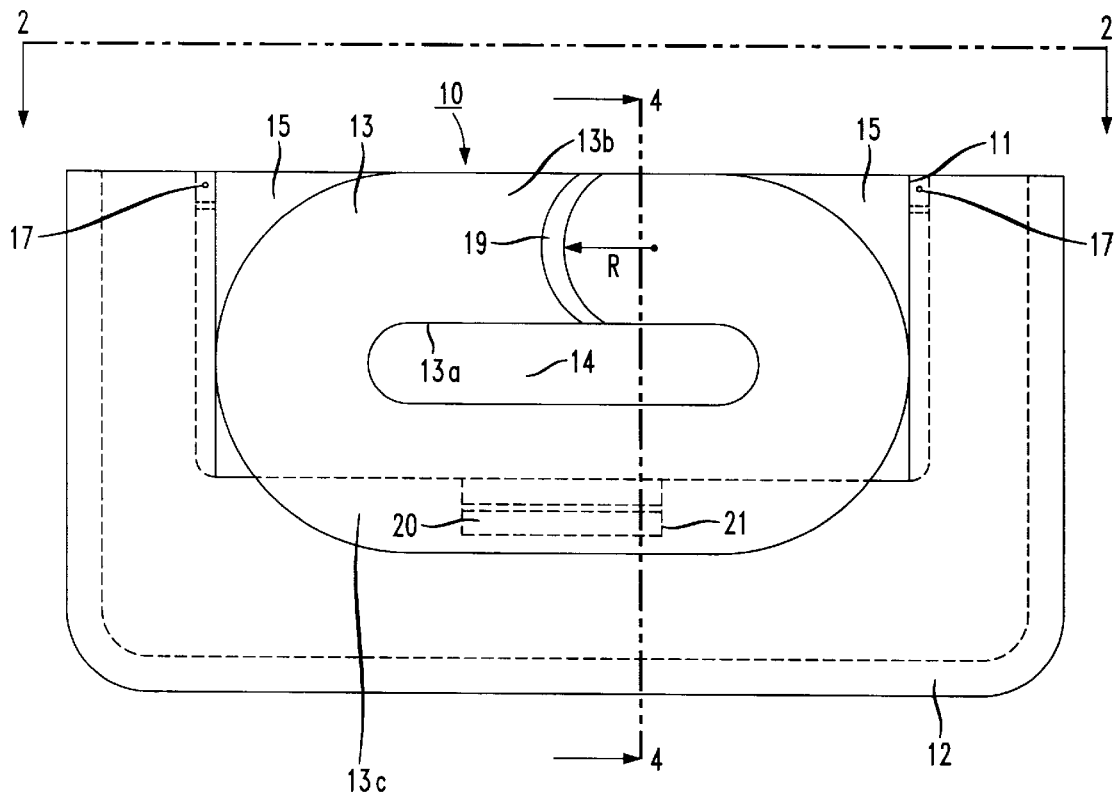
FIG. 1 is a front view of the present invention mated with slots of an opening of a junction box, illustrating the elongated O-shaped body and the curved gap in one plane.

With reference to the drawings, wherein the same reference number indicates the same element throughout, there is shown in FIG. 1 a front view of the present invention.

Figure 2:
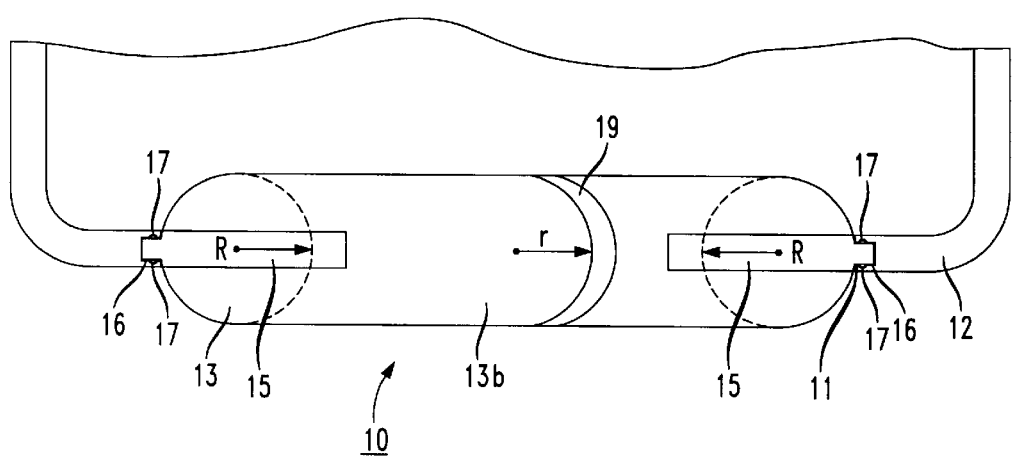
FIG. 2 is a top plan view illustrating cylindrical elongated O-shaped body and the curved gap in a second plane, taken along line 2—2 in FIG. 1.

The present invention, trough 10, as shown in FIG. 1, mates with a notch or opening 11 of a junction box 12. Trough 10 has a cylindrical elongated O-shaped body 13 generally similar to the shape of a donut. The hollow space defined by the elongated O-shaped body 13 is a compartment 14 for securing cables and/or wires. Cylindrical body 13 has a round cross-sectional area having a predetermined radius, R, as shown in FIGS. 2 and 4, resulting in a predetermined curvature for the inner section 13a of body 13.

Extending from the left and right sides of body 13 is a pair of integral ribs 15. Ribs 15 slidably mate with slots 16 of opening 11 of junction box 12 to hold trough 10 in a position to secure cables and/or wires entering or exiting a junction box 12. Each rib 15 has a pair of semi-spherical protrusions 17 which mates with a pair of corresponding semi-spherical recesses 18 in each slot 16 of opening 11 to provide positive retention of trough 10 with junction box 12. Semi-spherical protrusions 17 can be disengaged from semi-spherical recesses 19 by pulling trough 10 upward along slots 16 of opening 11, away from opening 11 of junction box 12.

Figure 3:
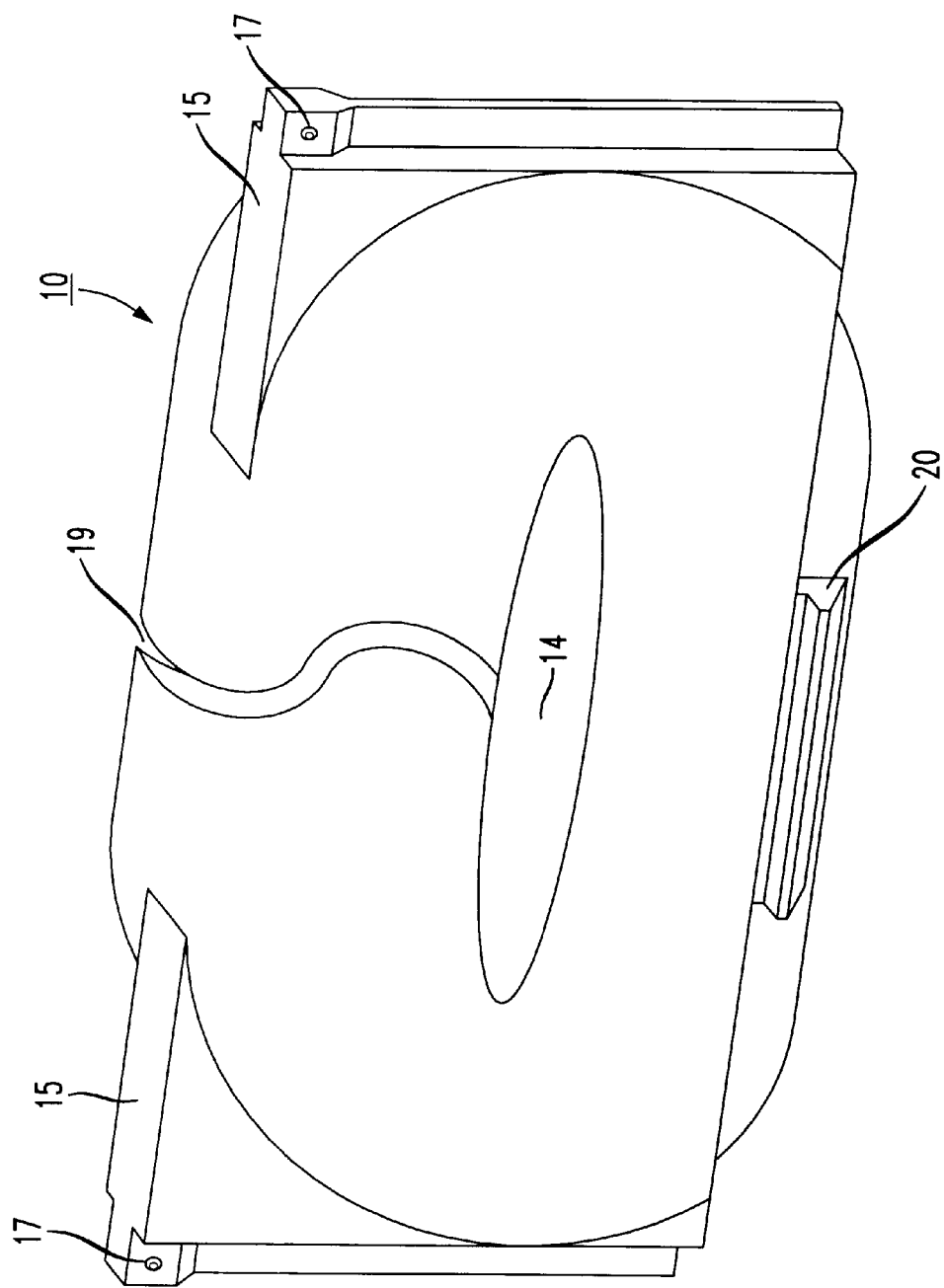
FIG. 3 is a perspective view of the present invention.

At the top section 13b of body 13 is a semi-circular curved gap 19. Gap 19 has semi-circular curves in two different planes, as shown in FIGS. 1, 2 and 3. Similar to the round cross-sectional area of cylindrical body 13, curved gap 19 has the same predetermined radius, R. Curved gap 19 provides fiber optic cables access to compartment 14; and prevents accidental slippage of cables from compartment 14 because cables must be bent into a configuration that match curved gap 19 to exit compartment 14.

Figure 4:
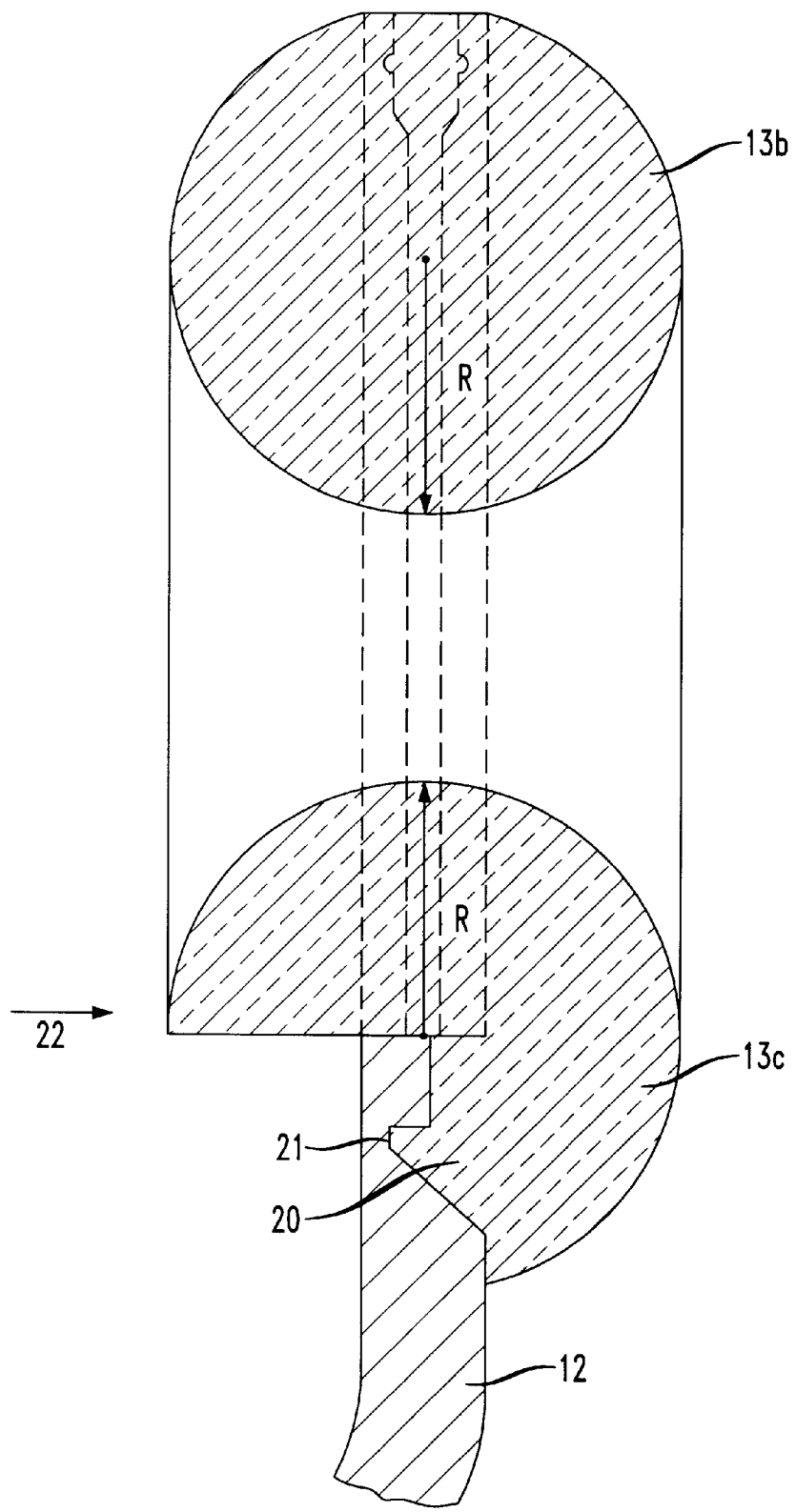
FIG. 4 is a cross-sectional view illustrating the second latching mechanism, taken along line 4—4 in FIG. 1.

As shown in FIG. 4, at the bottom section 13c of body 13, about one quarter, axially, of cylindrical body 13 is removed to accommodate a second retention mechanism for trough 10. Trough 10 is secured to opening 11 of junction box 12 by an integral latch 20 at the bottom section 13c of body 13. Integral latch 20 engages a corresponding groove 21 along opening 11 of junction box 12. Latch 20 is released from groove 21 by applying pressure against the bottom section 13c of body 13 in the direction shown by directional arrow 22 such that latch 20 clears groove 21 to allow trough 10 to slide upward along slots 16 of opening 11 of junction box 12.

The predetermined radius, R, of cylindrical body 13 and curved gap 19 equals to or greater than the predetermined minimum bend radius for fiber optic cables. In order to insert a fiber optic cable into compartment 14 of trough 10, the cable must traverse curved gap 19 at a curvature matching the predetermined radius, R. After insertion of a fiber optic cable into compartment 14 of trough 10, the cable rests along the curvature of the inner section 13b of body 13, which also has a predetermined radius, R. Regardless of the location and/or angle where the fiber optic cables originate from inside the junction box and the end location of the cables, the cables route through trough 10 at the predetermined radius R, which is not less than the minimum bend radius prescribed for the fiber optic cables. Henceforth, the integrity and performance of the fiber optic cables are not jeopardized.

The specification above discussed a trough 10 having a cylindrical elongated O-shaped body 13 defining one compartment 14. However, troughs having other cylindrical shaped body 13 and/or two or more adjacent compartments are contemplated, which correspond to the description for a one compartment trough 10 and is not separately discussed herein.

Figure 5:
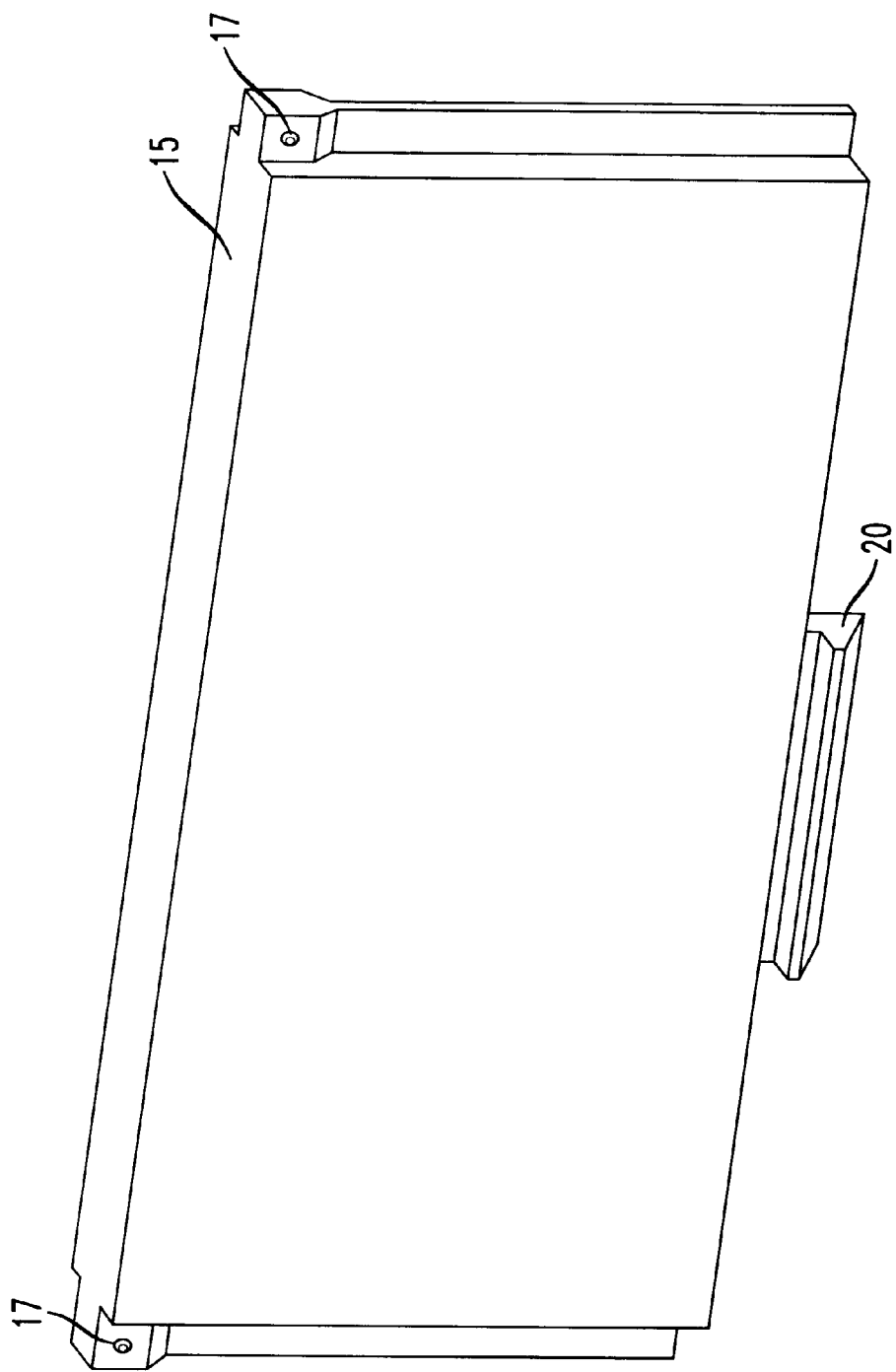
FIG. 5 is a perspective view of a second embodiment of the present invention.

The two retention mechanisms of trough 10 discussed above can be similarly apply to a flat solid plate, which would comprise ribs 15 without cylindrical elongated O-shaped body 13, as shown in FIG. 5, and extending over the entire area of opening 11, which correspond to the description of trough 10 and is not separately discussed herein.

Although certain features of the invention have been illustrated and described herein, other better modifications and changes will occur to those skilled in the art. It is, therefore, to be understood that the appended claims are intended to cover all such modification and changes that fall within the spirit of the invention.

What I claim is:

1. A device for retaining cables and/or wires entering or exiting an opening of a building entrance protector comprising:

a cylindrical elongated O-shaped body having an inner section defining a compartment therebetween for retaining said cables and/or wires; and a gap on said body providing said cables and/or wires access to said compartment.

2. The device according to claim 1 wherein said cylindrical elongated O-shaped body having a top portion, said gap located at said top portion.

3. The device according to claim 1 wherein said cylindrical body having a predetermined cross-sectional radius.

4. The device according to claim 1 wherein said elongated O-shaped body defines a first plane, said gap is semi-circular and curved at a predetermined radius along said first plane.

5. The device according to claim 4 wherein said gap is also semi-circular and curved at a predetermined radius along a second plane normal to said first plane.

6. A device for retaining cables and/or wires entering or exiting an opening of a building entrance protector, said opening having a pair of slots for securing said device with said building entrance protector, comprising:

a cylindrical elongated O-shaped body having a left and right sides, an inner section defining a compartment therebetween for retaining said cables and/or wires and a pair of integral ribs extending from said left and right sides of said body which slidably engage said slots of said opening of said building entrance protector; and a gap on said body providing said cables and/or wires access to said compartment.

7. The device according to claim 6 further comprising a first retention mechanism for securing said device at said opening of said building entrance protector comprising a pair of recesses on each of said slots and a pair of corresponding protrusions on each of said ribs for mating with said recesses.

8. The device according to claim 7 wherein said recesses on said slots and said corresponding protrusions on said ribs are semi-spherical.

9. The device according to claim 6 further comprising a second retention mechanism for securing said device at said opening of said building entrance protector, wherein said cylindrical elongated O-shaped body having a bottom section, one quarter of said cylindrical body, axially, is removed, comprising a groove along the opening of said building entrance protector and an integral latch extending from said bottom section for mating with said groove.

10. A device for retaining fiber optic cables having a predetermined minimum bend radius comprising:

a cylindrical elongated O-shaped body having an inner section defining a compartment therebetween for retaining said cables, said body having a predetermined cross-sectional radius equals to or greater than said minimum bend radius; and a gap on said body providing said cables access to said compartment.

11. The device according to claim 10 wherein said cylindrical elongated O-shaped body having a top portion, said gap located at said top portion.

12. The device according to claim 10 wherein said elongated O-shaped body defines a first plane, said gap is semi-circular and curved at a predetermined radius along said first plane.

13. The device according to claim 12 wherein said gap is also semi-circular and curved at a predetermined radius along a second plane normal to said first plane.

14. A device for retaining fiber optic cables having a predetermined minimum bend radius entering or exiting a building entrance protector having an opening, said opening having a pair of slots for securing said device with said entrance building protector comprising:

a cylindrical elongated O-shaped body having left and right sides and an inner section defining a compartment therebetween for retaining said cables, said body having a predetermined cross-sectional radius equals to or greater than said minimum bend radius;

a gap on said body providing said cables access to said compartment;

a pair of integral ribs extending from said left and right sides of said body which slidably engage said slots of said opening of said building entrance protector.

15. The device according to claim 14 further comprising a first retention mechanism for securing said device at said opening of said building entrance protector comprising a pair of recesses on each of said slots and a pair of corresponding protrusions on each of said ribs for mating with said recesses.

16. The device according to claim 15 wherein said recesses on said slots and said corresponding protrusions on said ribs are semi-spherical.

17. The device according to claim 14 further comprising a second retention mechanism for securing said device at said opening of said building entrance protector, wherein said cylindrical elongated O-shaped body having a bottom section, one quarter of said cylindrical body, axially, is removed, comprising a groove along the opening of said building entrance protector and an integral latch extending from said bottom section for mating with said groove.

\* \* \* \* \*